(12) United States Patent
Cunningham et al.

(10) Patent No.: US 10,946,886 B2
(45) Date of Patent: Mar. 16, 2021

(54) SLED TRANSPORT APPARATUS

(71) Applicants: Annette Cunningham, Tipton, IN (US); Thomas H. Downey, Tipton, IN (US)

(72) Inventors: Annette Cunningham, Tipton, IN (US); Thomas H. Downey, Tipton, IN (US)

( * ) Notice: Subject to any disclaimer, the term of this patent is extended or adjusted under 35 U.S.C. 154(b) by 0 days.

(21) Appl. No.: 16/162,941

(22) Filed: Oct. 17, 2018

(65) Prior Publication Data

US 2020/0122766 A1 Apr. 23, 2020

(51) Int. Cl.
*B62B 15/00* (2020.01)
*B62B 17/06* (2006.01)

(52) U.S. Cl.
CPC .......... *B62B 15/007* (2013.01); *B62B 17/061* (2013.01); *B62B 2202/52* (2013.01); *B62B 2203/44* (2013.01)

(58) Field of Classification Search
CPC ............................. B62B 15/00; B62B 15/007
See application file for complete search history.

(56) References Cited

U.S. PATENT DOCUMENTS

| | | | | |
|---|---|---|---|---|
| 906,261 A * | 12/1908 | Morzinski | ............... | B63B 35/26 114/355 |
| 3,237,222 A * | 3/1966 | Frost | ...................... | B63B 35/81 280/19 |
| 3,839,757 A * | 10/1974 | Grimes | ..................... | A47C 3/36 114/363 |
| 3,958,289 A * | 5/1976 | Carlson | .................... | B63B 25/00 114/364 |
| 4,282,616 A * | 8/1981 | Battershill | ................ | B63B 7/02 114/354 |
| 5,123,371 A * | 6/1992 | Giordano | ................ | B63C 13/00 114/344 |
| 5,168,825 A * | 12/1992 | Ring | ....................... | B63B 29/04 114/363 |
| 5,207,604 A * | 5/1993 | McMillin | ............. | B63H 21/265 114/144 R |
| 5,566,637 A * | 10/1996 | Benza | ..................... | B63B 17/00 114/343 |
| 5,884,795 A | 3/1999 | Godbersen | | |
| 5,911,422 A * | 6/1999 | Carpenter | ............... | B62B 3/007 280/10 |
| 6,076,298 A | 6/2000 | Teel | | |
| 6,497,424 B2 | 12/2002 | Gartner | | |
| 6,533,298 B2 | 3/2003 | Sims | | |
| 6,638,125 B1 * | 10/2003 | Mossel | ................. | B63B 35/811 114/253 |
| 6,648,349 B1 | 11/2003 | Waller | | |

(Continued)

*Primary Examiner* — James A Shriver, II
*Assistant Examiner* — James J Triggs

(57) ABSTRACT

A sled transport apparatus for transporting people and supplies on sand and snow includes a sled body having a bow, a stern, a starboard side, a port side, a bottom, an upper perimeter, and a cavity. A divider wall is coupled to the sled body and extends from the starboard side to the port side and from the bottom to the upper perimeter. The divider wall forms a cooler receptacle within the cavity from the divider wall to the stern that is configured to receive a cooler. A seat bottom is coupled to the sled body adjacent the divider wall and extending from the starboard side to the port side and toward the bow. A towrope is coupled to the sled body.

10 Claims, 4 Drawing Sheets

(56) References Cited

U.S. PATENT DOCUMENTS

| | | | | |
|---|---|---|---|---|
| 7,267,074 B1* | 9/2007 | Hicks | ............ | B63B 7/04 |
| | | | | 114/353 |
| 7,451,709 B2 | 11/2008 | Swartfager | | |
| 8,069,939 B1 | 12/2011 | Metzler | | |
| 8,474,393 B1* | 7/2013 | Chandler | ............ | B63B 7/04 |
| | | | | 114/352 |
| 8,784,010 B1* | 7/2014 | Cessac | ............ | F16L 9/19 |
| | | | | 14/69.5 |
| 8,910,956 B2* | 12/2014 | Bengtzen | ............ | A45C 5/14 |
| | | | | 220/4.24 |
| 9,340,224 B2* | 5/2016 | Yoder | ............ | B62B 19/00 |
| D786,626 S | 5/2017 | Golic | | |
| 2002/0070517 A1* | 6/2002 | Ramsey | ............ | A01K 97/22 |
| | | | | 280/47.19 |
| 2004/0025531 A1 | 2/2004 | Holloman | | |
| 2007/0013201 A1* | 1/2007 | Wagner | ............ | B60N 2/3011 |
| | | | | 296/24.43 |
| 2008/0224429 A1* | 9/2008 | Watson | ............ | B62B 15/00 |
| | | | | 280/19 |
| 2013/0277927 A1* | 10/2013 | Harvey | ............ | B62B 15/007 |
| | | | | 280/19 |
| 2017/0190390 A1* | 7/2017 | Neese | ............ | B63B 29/04 |

\* cited by examiner

SLED TRANSPORT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to sleds and more particularly pertains to a new sled for transporting people and supplies on sand and snow.

BRIEF SUMMARY OF THE INVENTION

An embodiment of the disclosure meets the needs presented above by generally comprising a sled body having a bow, a stern, a starboard side, a port side, a bottom, an upper perimeter, and a cavity. A divider wall is coupled to the sled body and extends from the starboard side to the port side and from the bottom to the upper perimeter. The divider wall forms a cooler receptacle within the cavity from the divider wall to the stern that is configured to receive a cooler. A seat bottom is coupled to the sled body adjacent the divider wall and extending from the starboard side to the port side and toward the bow. A towrope is coupled to the sled body.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
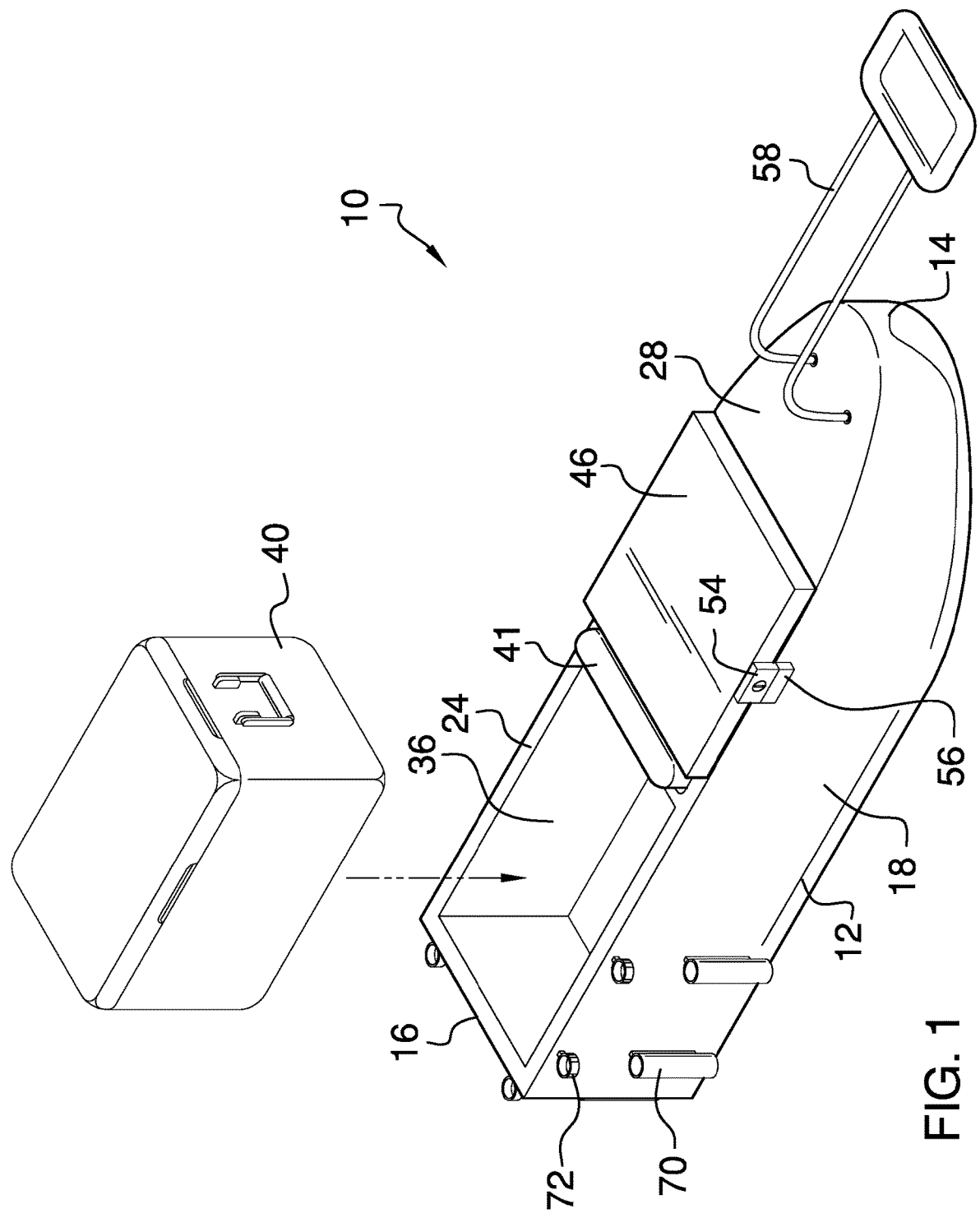
FIG. 1 is an isometric view of a sled transport apparatus according to an embodiment of the disclosure.
Figure 2:
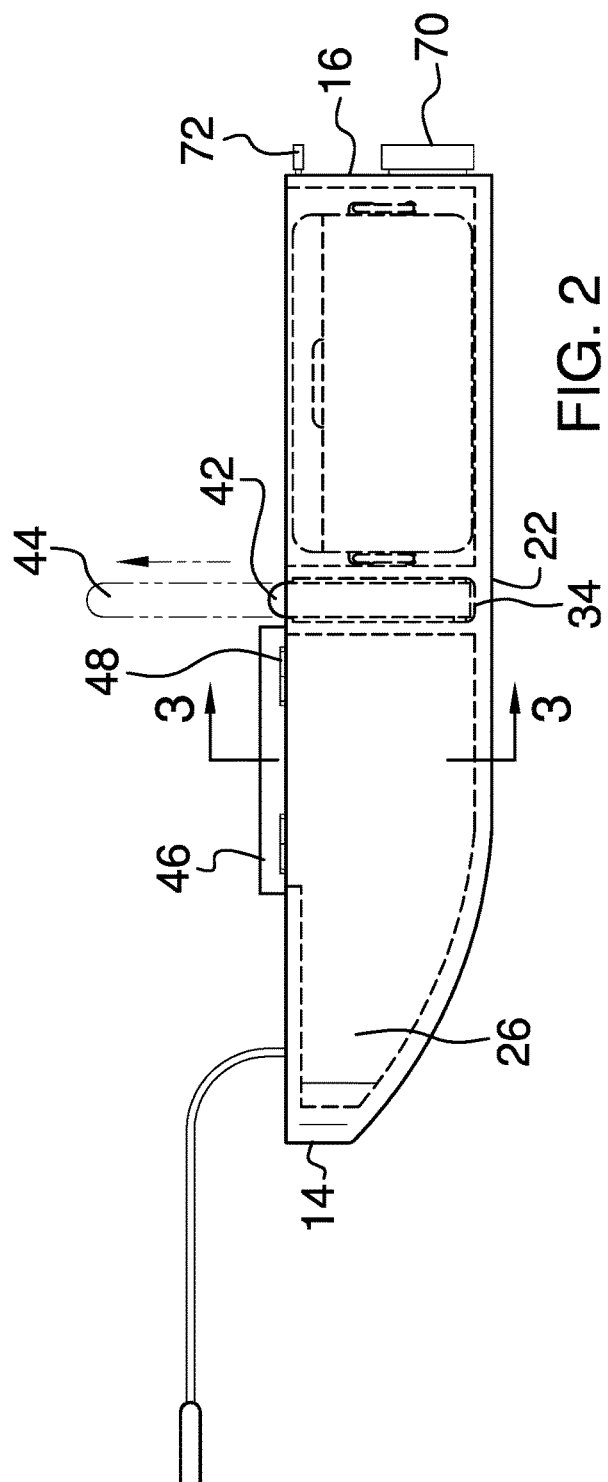
FIG. 2 is a side elevation view of an embodiment of the disclosure.
Figure 3:
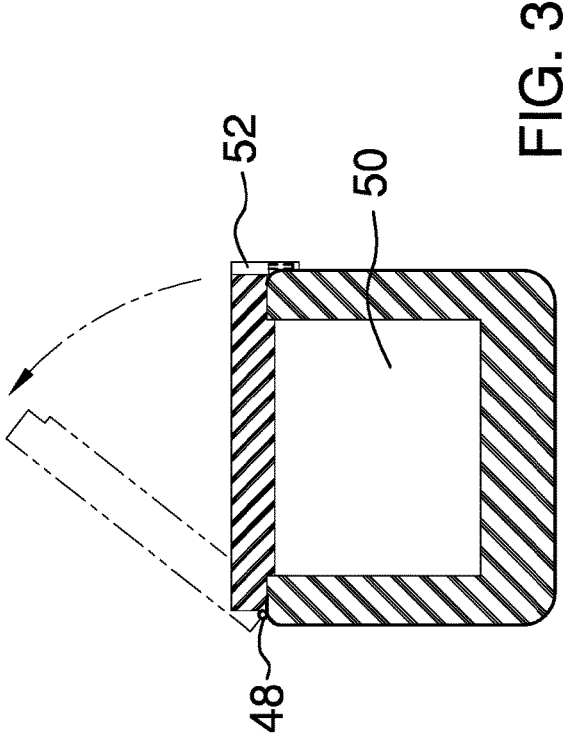
FIG. 3 is a cross-sectional view of an embodiment of the disclosure along line 3-3 of FIG. 2.
Figure 4:
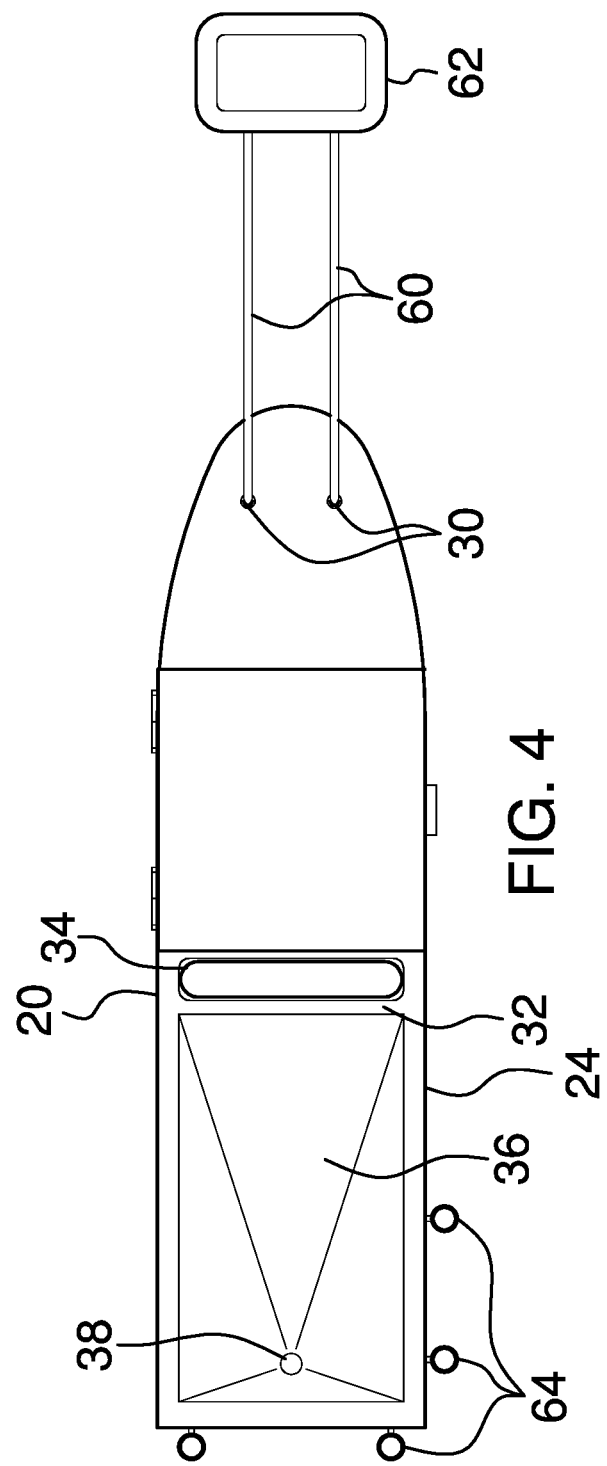
FIG. 4 is a top plan view of an embodiment of the disclosure.
Figure 5:
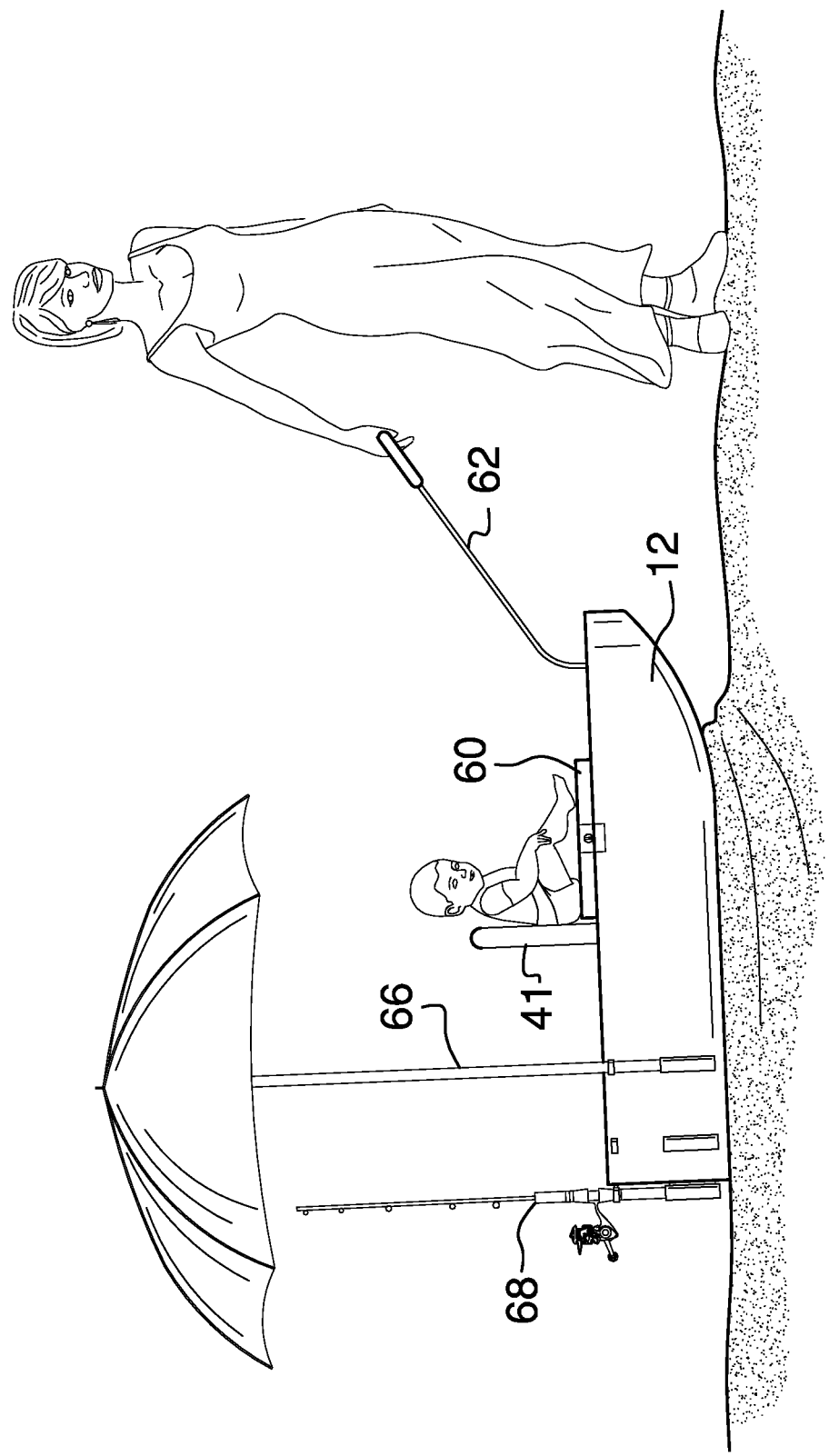
FIG. 5 is an in-use view of an embodiment of the disclosure.

With reference now to the drawings, and in particular to FIGS. 1 through 5 thereof, a new sled embodying the principles and concepts of an embodiment of the disclosure and generally designated by the reference numeral 10 will be described.

As best illustrated in FIGS. 1 through 5, the sled transport apparatus 10 generally comprises a sled body 12 having a bow 14, a stern 16, a starboard side 18, a port side 20, a bottom 22, and an upper perimeter 24. The sled body 12 has a cavity 26 between the bow 14, the stern 16, the starboard side 18, and the port side 20. The bow 14 may have a covered portion 28 with a pair of handle apertures 30 extending through to the cavity 26. A divider wall 32 is coupled to the sled body 12 extending from the starboard side 18 to the port side 20 and from the bottom 22 to the upper perimeter 24. The divider wall 32 may have a channel 34 extending through to the bottom 22 of the sled body and from proximal the port side 20 to proximal the starboard side 18. The divider wall 32 forms a cooler receptacle 36 within the cavity from the divider 32 to the stern 16. The cooler receptacle 36 may have a drainage aperture 38 extending through the bottom 22 of the sled body and is configured to receive a cooler 40. The drainage aperture 38 prevents water and sand from accumulating in the cooler receptacle 36.

A seatback 41 is slidingly engageable within the channel 34 and has a stored position 42 and an alternate raised position 44. A seat bottom 46 is coupled to the sled body 12 adjacent the divider wall 32 and extends from the starboard side 18 to the port side 20 and toward the bow 14. The seat bottom 46 may have a hinge 48 coupled to the port side 20 of the sled body so it may swingably open and alternatively close to cover a storage compartment 50 within the cavity 26. The storage compartment 50 extends from the divider wall 34 to the bow 14 and may be used to keep personal items such as bags, wallets, and keys. There may be a lock 52 to secure the contents of the storage compartment 50. The lock 52 has an upper portion 54 coupled to the seat bottom 46 and a bottom portion 56 coupled to the starboard side 18 of the sled body adjacent the upper perimeter 24. The bottom portion 56 and the upper portion 54 are lockably engageable.

A towrope 58 is coupled to the sled body 12 and may comprise a pair of ropes 60 and a handle 62. Each of the pair of ropes 60 is coupled to the handle 62 and to the bow 14 of the sled body. The pair of ropes 60 may be slidingly coupled through the pair of handle apertures 30 to store the towrope 58 within the cavity 26 and leave the handle 62 resting on the bow. The towrope 58 may be used to pull the sled body 12. A plurality of pole holders 64 may be coupled to the sled body, each being configured to secure an umbrella pole 66 or a fishing pole 68. Each of the plurality of pole holders 64 may comprise a base 70 and an upper support 72.

In use, the sled transport apparatus 10 may be dragged through sand or snow, for example while walking on the beach or to go ice fishing. The sled transport apparatus 10 may be used to conveniently carry a child or handicapped person on the seat bottom 46 as well as the cooler 40 in the cooler receptacle 36 and the fishing pole 68 and the umbrella 66 in the plurality of pole holders 64. Personal items may be locked in the storage compartment 50 for security while enjoying the beach.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A sled transport apparatus comprising:
   a sled body having a bow, a stern, a starboard side, a port side, a bottom, and an upper perimeter, the sled body having a cavity between the bow, the stern, the starboard side, and the port side;
   a divider wall coupled to the sled body, the divider wall extending from the starboard side to the port side and from the bottom to the upper perimeter, the divider wall forming a cooler receptacle within the cavity from the divider wall to the stern, the cooler receptacle being configured to receive a cooler;
   a seat bottom coupled to the sled body, the seat body being coupled adjacent the divider wall extending from the starboard side to the port side and toward the bow;
   a towrope coupled to the sled body; and
   the seat bottom having a hinge, the hinge being coupled to the port side of the sled body, the seat bottom swingably opening and alternatively closing to cover a storage compartment within the cavity, the storage compartment extending from the divider wall to the bow.

2. The sled transport apparatus of claim 1 further comprising a lock, the lock having an upper portion coupled to the seat bottom and a bottom portion being coupled to the starboard side of the sled body adjacent the upper perimeter, the bottom portion and the upper portion being lockably engageable so as to lock the contents of the storage compartment.

3. The sled transport apparatus of claim 1 further comprising the towrope comprising a pair of ropes and a handle, each of the pair of ropes being coupled to the handle and to the bow of the sled body.

4. The sled transport apparatus of claim 3 further comprising the bow having a covered portion, the covered portion having a pair of handle apertures extending through to the cavity and the pair of ropes being slidingly coupled through the pair of handle apertures.

5. The sled transport apparatus of claim 2 further comprising the divider wall having a channel extending through to the bottom of the sled body and from proximal the port side to proximal the starboard side, a seatback being slidingly engageable within the channel, the seatback having a stored position and an alternate raised position.

6. The sled transport apparatus of claim 5 further comprising the cooler receptacle having a drainage aperture extending through the bottom of the sled body.

7. The sled transport apparatus of claim 2 further comprising a plurality of pole holders coupled to the sled body, each of the plurality of pole holders being configured to secure an umbrella pole or a fishing pole.

8. The sled transport apparatus of claim 7 further comprising each of the plurality of pole holders comprising a base and an upper support.

9. A sled transport apparatus comprising:
   a sled body having a bow, a stern, a starboard side, a port side, a bottom, and an upper perimeter, the sled body having a cavity between the bow, the stern, the starboard side, and the port side, the bow having a covered portion, the covered portion having a pair of handle apertures extending through to the cavity;
   a divider wall coupled to the sled body, the divider wall extending from the starboard side to the port side and from the bottom to the upper perimeter, the divider wall having a channel extending through to the bottom of the sled body and from proximal the port side to proximal the starboard side, the divider wall forming a cooler receptacle within the cavity from the divider wall to the stern, the cooler receptacle having a drainage aperture extending through the bottom of the sled body, the cooler receptacle being configured to receive a cooler;
   a seatback being slidingly engageable within the channel, the seatback having a stored position and an alternate raised position;
   a seat bottom coupled to the sled body, the seat body being coupled adjacent the divider wall extending from the starboard side to the port side and toward the bow, the seat bottom having a hinge coupled to the port side of the sled body, the seat bottom swingably opening and alternatively closing to cover a storage compartment within the cavity, the storage compartment extending from the divider wall to the bow;
   a lock having an upper portion coupled to the seat bottom and a bottom portion being coupled to the starboard side of the sled body adjacent the upper perimeter, the bottom portion and the upper portion being lockably engageable so as to lock the contents of the storage compartment;
   a towrope coupled to the sled body, the towrope comprising a pair of ropes and a handle, each of the pair of ropes being coupled to the handle and to the bow of the sled body, the pair of ropes being slidingly coupled through the pair of handle apertures; and
   a plurality of pole holders coupled to the sled body, each of the plurality of pole holders being configured to secure an umbrella pole or a fishing pole, each of the plurality of pole holders comprising a base and an upper support.

10. A cooler and a sled transport apparatus combination comprising:
- a cooler;
- a sled body having a bow, a stern, a starboard side, a port side, a bottom, and an upper perimeter, the sled body having a cavity between the bow, the stern, the starboard side, and the port side, the bow having a covered portion, the covered portion having a pair of handle apertures extending through to the cavity;
- a divider wall coupled to the sled body, the divider wall extending from the starboard side to the port side and from the bottom to the upper perimeter, the divider wall having a channel extending through to the bottom of the sled body and from proximal the port side to proximal the starboard side, the divider wall forming a cooler receptacle within the cavity from the divider wall to the stern, the cooler receptacle having a drainage aperture extending through the bottom of the sled body, the cooler receptacle selectively receiving the cooler;
- a seatback being slidingly engageable within the channel, the seatback having a stored position and an alternate raised position;
- a seat bottom coupled to the sled body, the seat body being coupled adjacent the divider wall extending from the starboard side to the port side and toward the bow, the seat bottom having a hinge coupled to the port side of the sled body, the seat bottom swingably opening and alternatively closing to cover a storage compartment within the cavity, the storage compartment extending from the divider wall to the bow;
- a lock having an upper portion coupled to the seat bottom and a bottom portion being coupled to the starboard side of the sled body adjacent the upper perimeter, the bottom portion and the upper portion being lockably engageable so as to lock the contents of the storage compartment;
- a towrope coupled to the sled body, the towrope comprising a pair of ropes and a handle, each of the pair of ropes being coupled to the handle and to the bow of the sled body, the pair of ropes being slidingly coupled through the pair of handle apertures; and
- a plurality of pole holders coupled to the sled body, each of the plurality of pole holders being configured to secure an umbrella pole or a fishing pole, each of the plurality of pole holders comprising a base and an upper support.

* * * * *